United States Patent [19]
Krellen

[11] 3,741,377
[45] June 26, 1973

[54] CONTACT LENS CASE

[76] Inventor: Norman L. Krellen, 316 Jones Road, Vestal, N.Y. 13850

[22] Filed: June 4, 1971

[21] Appl. No.: 150,069

[52] U.S. Cl. ..... 206/5 A, 206/56 AB, 206/DIG. 29, 220/31 S
[51] Int. Cl. ........................................... A45c 11/04
[58] Field of Search ................. 206/5 R, 5 A, 56 A, 206/56 AB, DIG. 29; 220/31 S, 38.5; 215/99; D57/1; 134/166 R

[56] References Cited
UNITED STATES PATENTS

| 3,536,082 | 10/1970 | Kolbeck | 206/5 A X |
| 3,414,117 | 12/1968 | Leeds | 206/5 A |
| 3,596,822 | 8/1971 | Holley | 220/31 S UX |
| 3,331,497 | 7/1967 | Lunsford | 206/56 A |
| 2,833,327 | 5/1958 | Boyce | 206/DIG. 29 |
| 2,171,675 | 9/1939 | Travnitschek | 206/DIG. 29 |
| 3,268,068 | 8/1966 | Le Grand | 206/5 A |
| D210,248 | 2/1968 | Nissel | D57/1 |
| 2,894,654 | 7/1959 | Lohrer | 215/41 |

Primary Examiner—George E. Lowrance
Assistant Examiner—Steven E. Lipman
Attorney—J. Harold Kilcoyne

[57] ABSTRACT

A plastic contact lens case of a size and thickness suited to the storing of large stocks and/or inventories of contact lenses, in pairs or single lens, in orderly array and in readily identifiable manner in the drawer of a commercial photo-slide file case, and being adapted for sending contact lenses, either as contact lens blanks or as finished lenses, through the mail in regular mailing envelopes, and also for use by contact lens wearers as a pocket and/or hand-bag carrying and/or an overnight storage case therefor.

2 Claims, 5 Drawing Figures

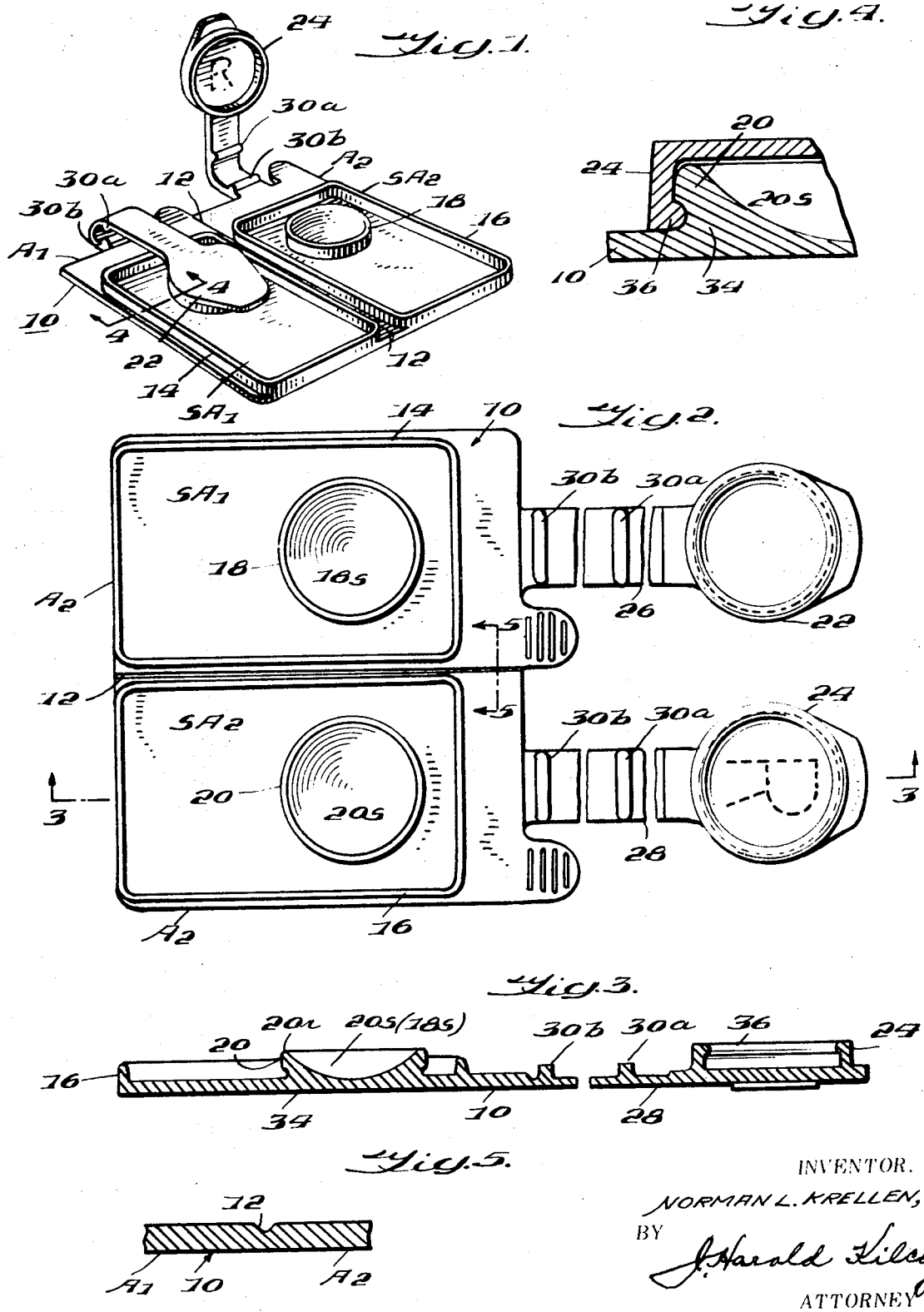

3,741,377

CONTACT LENS CASE

INTRODUCTION

This invention relates to improvements in contact lens cases, and more particularly to a case characterized by a design which ideally suits cases of the invention to the storing of large stocks or inventories of contact lens blanks (or prescription lenses) in orderly manner and/or to the sending of contact lenses safely through the mail in standard mailing envelopes, and whose design is further such as to provide wearers of contact lenses with both an overnight storage case therefor and a carrying case for transporting a lens or lenses in handbags and the like.

BACKGROUND OF THE INVENTION

Understandably, the growing use of contact lenses in place of conventional eyeglasses has brought forth numerous proposals and suggestions for a contact lens case suitable to the overnight storage and carrying about on the person or in handbags, for example, of such lenses when not in use. However, such prior lens cases, while perhaps capable of performing their intended purpose, are not well suited to the storage of large stocks of contact lens blanks, i.e. contact lenses prior to their being finished according to prescription, by the manufacturer thereof, for example, and/or to the storage of inventories of prescription contact lenses in laboratories for diagnostic purposes, nor have they been designed to serve as a mailing case for the transmission of lenses from the manufacturer to the purchaser through ordinary mailing channels.

OBJECTS OF THE INVENTION

Broadly stated, the present invention contemplates and provides a contact lens case ideally suited to the storage of contact lenses in pairs or singly, either lens blanks or after finishing into prescription lenses, as well as for sending the finished prescription lenses through the mail in regular mailing envelopes.

The invention also contemplates and provides an initially two-compartment case for a pair of contact lenses, characterized by a construction and design which makes possible and highly feasible the storage of large stocks or inventories of contact lenses, either in pairs or singly, in orderly and readily identifiable manner and in a minimum of space.

Yet another aim and object of the invention is the provision of a contact lens case characterized as last described and which may be fashioned of plastic material and in different colors, thus allowing color coding of stocks or inventories of contact lenses either in blank or finished form.

Another aim of the invention is the provision of an initially two-compartment or double lens case, each with its own openable and closeable cap, which may be readily cut apart into two single but matched lens cases, each suited for use in stocking a single blank or a finished contact lens, i.e. prescription lens, and/or for mailing such a lens.

Still another aim and object of the invention is the provision of a two-compartment contact lens case fashioned from thin plastic material, each compartment of which has its own closure cap hingedly connected to the case proper by a strapform hinge also of plastic material, and wherein said straphinge is provided with means protecting it against being broken or cracked by being doubled too tightly or closely on itself.

Still another object and aim of the invention is the provision of a two-compartment contact lens case, each compartment thereof being closeable by a hinged cap as last above, and wherein one cap only on an outer surface carries tactile means enabling its identification by an individual who cannot see without glasses or upon removable of his contact lens, and the other cap is purposely left unmarked so that it may be used either as a single lens case or as a mailer when the initially two-compartment case is cut in half, for example.

Yet another aim and object of the invention is the provision of an initially two-compartment contact lens case, one compartment being intended for the encasement of the right lens and the other for either the left lens or for use as a mailing case for either a right or a left contact lens, and which as a two-compartment case is of a size such that it fits perfectly into standard photo-slide file cases readily available on the market.

THE INVENTION

The above stated and other aims, objects and features of advantage of the present invention are attained by a contact lens case now to be described in detail, reference being had to the accompanying drawing illustrating a preferred form thereof, wherein:

FIG. 1 is a perspective view of an initially two-compartment contact lens case according to the invention as viewed generally from above same, the view illustrating one compartmentclosing cap means raised and the other lowered into the lens-compartment closing and sealing position;

FIG. 2 is a top plan view of a contact lens case according to the invention, with the closure caps shown in full open position, and their hinge straps extended and foreshortened;

FIG. 3 is a longitudinal section taken generally along line 3—3 of FIG. 2;

FIG. 4 is a fragmentary section taken on line 4—4 of FIG. 1; and

FIG. 5 is a section taken along line 5—5 of FIG. 3.

In said drawing, FIGS. 1 and 2 in particular illustrate that a contact lens case of the invention, being preferably of the two-compartment type initially, i.e. as fabricated and sold, comprises a thin rigid sheet or plate 10 having generally rectangular configuration and surface area requisite for a two-compartment or double lens case, and correspondingly, when cut (or otherwise separated into two half-parts) along a longitudinal medial score line 12 (FIG. 5) indented or otherwise sunk into the upper surface of the sheet 10, the surface areas requisite for two single lens cases.

As also seen in FIGS. 1 and 2, said half areas (designated $A_1$ and $A_2$) are further reduced to sub-area size by the provision of upstanding, rectangularly configured rims 14, 16 running continuously thereabout and within said sub-areas (designated $SA_1$ and $SA_2$) and preferably disposed symmetrically to the sides of their longitudinal center lines are provided short-height cylindrical formations 18, 20 whose upper-end surfaces 18s, 20s, rather than being square with their upright cylindrical walls, are instead formed as part-spherical segmental surfaces struck from centers disposed a short distance above and on the axes of said cylindrical formations, as results in the upper-end surfaces defining open-top shallow recesses, each providing a contact lens compartment.

Preferably, said recess-defining surfaces 18s, 20s extend substantially fully to the upper-end edges of said cylindrical formations, which latter are preferably gently radiused as at 18r, 20r whereby the possibility of scratching a contact lens is moving same into and from a compartment is substantially avoided.

Said open-top lens compartments are adapted to be closed by closure caps 22, 24 which are hingedly connected to the sheet or plate 10 constituting the main structural member of the case, by flexible hinge straps 26, 28, and it is a feature of the invention that to guard against said hinge straps being broken or cracked by being doubled on themselves too tightly or closely, they are provided as shown with transverse ribs 30a, 30b which are positioned along the length of a hinge strap to abut one another when said strap is doubled back on itself a predetermined amount.

By reference to FIG. 4 in particular, it will be seen that the cylindrical walls of the aforementioned cylindrical formations 18, 20 immediately adjacent their junctions with the planar surface of the sheet or plate 10, from which said formations project, are each formed with an annular groove 34. FIG. 4 also shows that the inner cylindrical wall of each of the closure caps 22, 24 is formed with a radially inwardly directed annular head 36 sized and radiused as to closely fit into said groove 34. Thus, upon a closure cap being brought to lens-compartment closing position, said annular rib 36 thereof snaps into the groove 34 with such a close fit as not only to secure the cap tightly to its associated cylindrical formation but also to render the compartment leakproof. Thus, a lens may be stored in each said compartment in either wet or dry condition.

Preferably, a contact lens case according to the invention will be fashioned by injection-molding same complete from a suitable high-impact plastic which may be a colored plastic. Further, to attain the objective of the invention of providing an initially two-compartment case for a pair of contact lens enabling and making possible the storage of large stocks or inventories of such lenses, either in pairs or singly, in a minimum of space, it is contemplated that the generally rectangular plate or sheet member 10 have an overall width dimension not substantially exceeding 2.000 and a length dimension (with caps closed) not exceeding 1.750, and finally an overall case thickness (with caps closed) not exceeding 0.200. When so dimensioned, the initially two-compartment contact lens case will be found to fit perfectly into standard photo-slide file cases, such yielding the very desirable result that a contact lens case of the invention can be used in storaging large stocks or inventories of contact lenses either in blank form or even finished or prescription lenses.

A two-compartment lens case of the invention may also be separated (cut) into two halves, the scored line 12 between the two halves of the case as fabricated facilitating this halving operation and giving the two matched single lens cases, either one or both of which may be used as a file for stock lenses in a special file cabinet, for example.

Preferably also, one of the caps is provided, in the fabrication of the case, with a raised letter R on the outer surface of the cap, as indicated in broken lines (FIGS. 1 and 2) and in full lines (FIG. 3). This raised letter R in the final case may be used for tactile identification by a contact lens user who cannot see when his contact lenses are removed or by an individual using conventional eyeglasses when his glasses are removed. It is contemplated also that the other cap will be devoid of any tactile identification, such as the raised letter L, for example, whereby it may be used as a single lens case or a mailing case for a single lens when the case is cut in half.

In connection with the mention above that plastic cases according to the invention may be made of plastics of different color, such is a very desirable feature as it allows for color coding of contact lens stocks in laboratories and doctors' offices before finishing same into prescription lenses, as well as for storing lenses for diagnostic purposes, for example.

Having disclosed my invention in the foregoing, what is claimed is:

1. A plastic contact lens case of a size and thickness suited to the storing of large stocks and/or inventories of contact lenses, in pairs or single lens, in orderly array and in readily identifiable manner in the drawer of a commercial photo-slide file case, and to the sending of contact lenses, either as contact lens blanks or as finished lenses, through the mail in regular mailing envelopes, and also to use by contact lens wearers as a pocket and/or handbag carrying and/or an overnight storage case therefor, comprising:

a thin, substantially rigid, generally planar plate of plastic material having rectangular configuration, the length and width of which is such as to provide same with surface area requisite for an initially two-compartment contact lens case and correspondingly with two side-by-side sub-areas each requisite for a single-compartment lens case; two short-height cylindrical formations integral with and extending upwardly from the upper face of said plate and being disposed symmetrically to the sides of the vertical center lines of said two side-by-side sub-areas;

the end surfaces of said formations being each recessed to provide a contact lens-holding compartment;

caps capable of being snap fit on the upper ends of said cylindrical formations and adapted when snap-fitted thereto to close said recesses;

flexible hinge straps interconnecting said caps to an upper-edge portion of said plate and adapted when loosely doubled on themselves along a transverse fold line of each to position said caps above said recesses;

a pair of spaced, upstanding, extending rib means on each of said hinge straps and being positioned thereon to abut on one another when said straps are too forcefully doubled on themselves and being in a normally non-contacting position when said caps are snap-fitted on said formation upper ends, said two side-by-side sub-areas being delineated by a readily visible line of weakness providing indication of the line of separation to be followed in converting an initially two-compartment lens case as aforesaid into two single-compartment matched lens cases;

and the exterior of only one of said caps being provided with visual and tactile identification indicia.

2. A plastic contact lens case according to claim 1, wherein said case is fashioned from a plastic of a color individual to a line of contact lenses, thereby allowing color coding of contact lens stocks, either before or after the lenses are finished into prescription lenses.

* * * * *